United States Patent Office 2,868,766
Patented Jan. 13, 1959

2,868,766

**PHENYLMETHYLSILOXANE DIPHENYL-
SILOXANE COPOLYMERS**

Oscar K. Johannson, Midland, Mich., assignor to Dow
Corning Corporation, Midland, Mich., a corporation
of Michigan No Drawing. Application July 8, 1955
Serial No. 520,923

2 Claims. (Cl. 260—46.5)

This application relates to improved copolymers of diphenylsiloxane and phenylmethylsiloxane and to a method of making them.

It has long been appreciated that phenylsiloxanes were the most thermally stable of all siloxanes presently known. Consequently ever since the beginning of the commercial utilization of siloxanes attempts have been made to prepare polysiloxanes having a high phenyl content. Whereas this has previously been accomplished in the resin field that is in siloxanes having an average of less than 1.7 organic groups per silicon there has been to date no method of preparing high polymeric diorgano siloxanes having a phenyl content above 35 mol percent diphenylsiloxane. The applicant has discovered a method of preparing copolymers of diphenyl and phenylmethylsiloxane having up to 90 mol percent diphenylsiloxane. Thus for the first time such copolymers are available in a commercially usable form.

It has been found unexpectedly that the copolymers of this invention produce excellent, tough, flexible films when cast from solvent solution. These films are self supporting and are by far the best self supporting pure siloxane films known. They are characterized by extremely good thermal stability both from the standpoint of decomposition and from the standpoint of softening.

For example, films prepared from the copolymers of this invention show little softening until the temperature approaches 400° C. All heretofore known diorganosiloxane copolymers soften at temperatures of 200° C. or below. Another beneficial property of the instant copolymers is their excellent resistance to aromatic and aliphatic hydrocarbon solvents. This represents a substantial improvement since all heretofore known siloxanes, both resins and elastomers, are readily softened by hydrocarbon solvents. By contrast some of the siloxanes of this invention are soluble only in such solvents as hot diphenylether or hot chlorinated hydrocarbons. The copolymers precipitate from these solvents when they are cooled. Consequently the products of this invention are suitable for electrical insulation and for other uses requiring a combination of good insulating ability, high thermal stability and solvent resistance.

This invention relates to copolymers consisting essentially of from 40–90 mol percent diphenylsiloxane and from 10–60 mol percent phenylmethylsiloxane. If desired, the copolymers may contain up to 10 mol percent siloxane units of the formula PhRSiO where R is an aliphatic hydrocarbon radical of 2 carbon atoms.

The copolymers of this invention are prepared by polymerizing hexaphenylcyclotrisiloxane with a cyclic phenylmethylsiloxane at a temperature above 175° C. in the presence of alkali metal salts of phenyl or methylsilanols in amount from 1 alkali metal atom per 500 Si atoms to 1 alkali metal atom per 50,000 Si atoms. If desired, up to 10 mol percent cyclic phenylethyl or phenylvinylsiloxane may be included. A combination of phenylethyl and phenylvinyl may be employed provided the total does not exceed 10 mol percent of the entire copolymer.

All of the copolymers within the scope of this invention are characterized by the formation of free films when cast from solvent. The best solvent resistance, and thermal stability is obtained with copolymers consisting essentially of diphenyl and phenylmethyl siloxane. Both of these properties improve with increasing diphenyl content. Polymers and copolymers of phenylsiloxanes which are outside the scope of this invention do not possess these desirable properties.

In carrying out the reaction of this invention the temperature of the mixture must be above 175° C. Preferably the temperature is 200° C. or higher. The mixture is heated at these temperatures until the desired state of polymerization is obtained. In general, the polymerization temperature should be less than 300° C. Preferably the polymerization should be carried out in the absence of a solvent although high boiling solvents such as diphenylether may be used if desired.

The catalyst employed in the method of this invention is any alkali metal salt of a phenylsilanol or a methylsilanol such as, for example, the sodium salt of diphenylmethylsilanol, the potassium salt of phenyldimethylsilanol, the salt

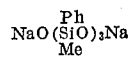

the lithium salt of trimethylsilanol, the lithium salt of phenylmethyldiol, the salt

and the potassium salt of triphenylsilanol.

These salts should be employed in amount so that the alkali metal to silicon ratio in the polymer is from 1 to 50,000 to 1 to 500. When the salts employed are those of triorganosilanols it is preferable that the ratio be less than 1 to 5,000 alkali metal atoms to silicon atoms. When the corresponding alkali metal hydroxides are employed the rate of polymerization is exceedingly slow or will not go at all because of the formation of a coating of high polymers around the alkali metal hydroxide particles. When the above alkali metal salts are used better distribution of the alkali is obtained and this difficulty is avoided.

It is essential in preparing the polymers of this invention that the cyclic trimer of diphenylsiloxane be employed. Repeated attempts to prepare copolymers using the cyclic tetramer of diphenylsiloxane invariably resulted is viscous, sticky, unusable masses. They were evidently of low molecular weight and were completely unsuited for the formation of the free films of this invention. The size of the phenylmethyl, phenylethyl or phenylvinylsiloxane cyclics used is not critical. Thus one may employ either the cyclic trimers of these latter siloxanes or the cyclic tetramers or higher cyclics.

In preparing films from the compositions of this invention the copolymer is best dissolved in a high boiling solvent such as diphenylether or chlorinated diphenylethers or in chlorobenzene or other chlorinated aromatic solvents. The solution is then applied to a flat surface and the solvent evaporated at a suitable temperature whereupon a film is produced. These films are readily stripped from the surface and may be employed as tapes or sheets for wrapping electrical conductors or other objects.

If desired, the polymer may be coated directly onto wire from a solution and employed as a wire enamel.

The term "consisting essentially of" as employed herein means that the properties of the copolymers are determined by the essential ingredients defined herein but that the copolymers may contain traces of other siloxanes present as impurities or introduced along with the catal-

Example 1

A mixture of 26.02 g. of hexaphenylcyclotrisiloxane and 5.96 g. of triphenyltrimethylcyclotrisiloxane were heated at 210° C. until they were fluid and then .0047 g. of the salt $Ph_2MeSiOLi$ was added. Heating was continued at 210° C. for 5 hours. A solid opaque mass was obtained which was a copolymer of 75 mol percent $Ph_2SiO$ and 25 mol percent PhMeSiO. This was dissolved in hot diphenylether and the solution was poured into an aluminum dish and the solvent was removed in an oven. The solvent thereupon evaporated leaving a flexible film which did not dissolve in toluene.

Example 2

A mixture of 3.3 g. of triphenyltrimethylcyclotrisiloxane and 27.6 g. of hexaphenylcyclotrisiloxane was melted and .0044 g. of the salt $Ph_2MeSiOLi$ was added. The mixture was heated at 210° C. for 20 hours. The resulting copolymer of 85 mol percent $Ph_2SiO$ and 15 mol percent PhMeSiO was dissolved in hot diphenylether to give a 5 percent solution and was cast onto an aluminum plate as in Example 1 to give a flexible film. Another portion of the solution was employed to impregnate glass cloth. After the solvent was removed the impregnated cloth was flexible and useful as an electrical tape.

Example 3

A mixture of 28.1 g. of hexaphenylcyclotrisiloxane, 19.1 g. of triphenyltrimethylcyclotrisiloxane was melted and .001 g. of $Me_3SiOK$ was added. The mixture was heated at 200° C. for 24 hours to give a solid copolymer having the composition 50 mol percent $Ph_2SiO$ and 50 mol percent PhMeSiO. The copolymer was dissolved in hot chlorobenzene and the catalyst was neutralized by adding trimethylchlorosilane. The solution was poured onto an aluminum plate and the solvent was evaporated at 80° C. leaving a flexible, tough film. This film was insoluble in toluene. It did not soften after 18 hours at 300° C. during which time it lost 15 percent of its weight. The films softened slightly when heated to 400° C.

Example 4

Employing the method of Example 1 a copolymer was prepared from a mixture of 14 g. of hexaphenylcyclotrisiloxane, 8.7 g. of triphenyltrimethylcyclotrisiloxane and 1.1 g. of tetravinyltetraphenylcyclotetrasiloxane using .0038 g. of $Ph_2MeSiOLi$ as a catalyst. The resulting copolymer was soluble in toluene and formed a clear, tough flexible film when cast from that solvent. It was composed of 50 mol percent $Ph_2SiO$, 45 mol percent PhMeSiO and 5 mol percent PhViSiO.

That which is claimed is:

1. A solid copolymer composed of from 40 to 90 mol percent diphenylsiloxane and from 10 to 60 mol percent phenylmethylsiloxane.

2. A solid copolymer consisting essentially of from 40 to 90 mol percent diphenylsiloxane, from 10 to 60 mol percent phenylmethylsiloxane and from 0 to 10 mol percent siloxane of the formula PhRSiO in which R is an aliphatic hydrocarbon radical of 2 carbon atoms.

References Cited in the file of this patent

UNITED STATES PATENTS

| | | |
|---|---|---|
| 2,410,346 | Hyde | Oct. 29, 1946 |
| 2,490,357 | Hyde | Dec. 6, 1949 |
| 2,541,137 | Warrick | Feb. 13, 1951 |
| 2,620,317 | Johannson | Dec. 2, 1952 |
| 2,634,284 | Hyde | Apr. 7, 1953 |
| 2,737,506 | Hurd et al. | Mar. 6, 1956 |

OTHER REFERENCES

Bennett: Concise Chemical and Technical Dictionary, page 26, Chem. Pub. Co., Inc., N. Y., 1947.